No. 875,802. PATENTED JAN. 7, 1908.
E. E. GOOD.
TEAT CUP FOR MILKING APPARATUS.
APPLICATION FILED FEB. 11, 1907.
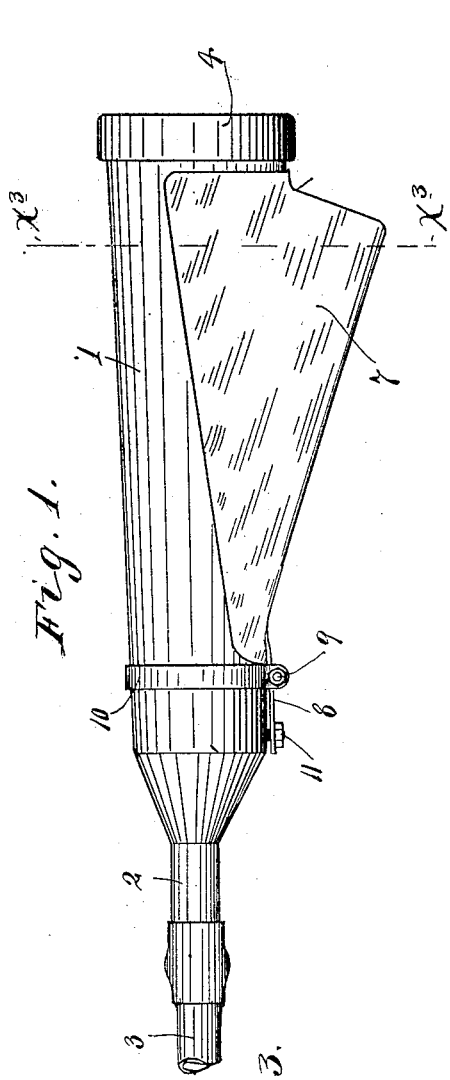
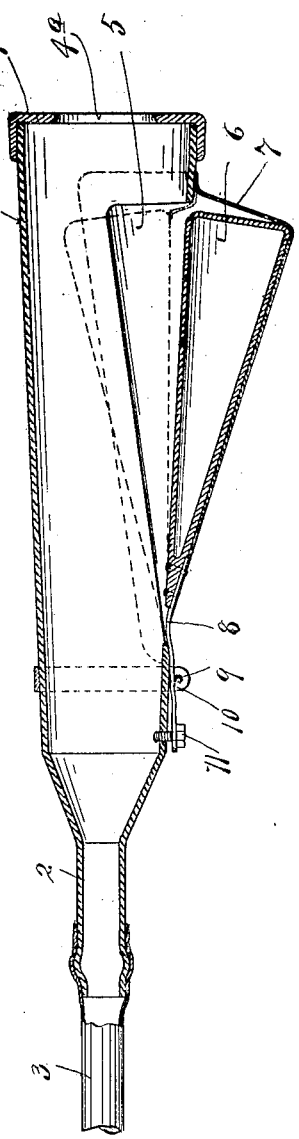
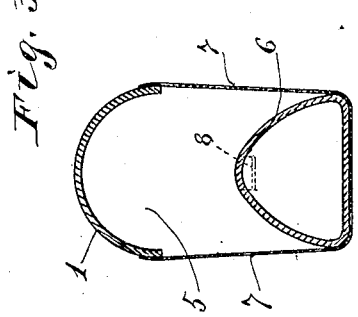
Witnesses.
A. H. Opsahl.
Malie Hoel.
Inventor.
Ezra E. Good
By his Attorneys.
Williamson & Merchant

UNITED STATES PATENT OFFICE.

EZRA E. GOOD, OF WATERLOO, IOWA.

TEAT-CUP FOR MILKING APPARATUS.

No. 875,802. Specification of Letters Patent. Patented Jan. 7, 1908.

Application filed February 11, 1907. Serial No. 356,673.

*To all whom it may concern:*

Be it known that I, EZRA E. GOOD, a citizen of the United States, residing at Waterloo, in the county of Blackhawk and State of Iowa, have invented certain new and useful Improvements in Teat-Cups for Milking Apparatus; and I do hereby declare the following to be a full, clear, and exact description of the invention, such as will enable others skilled in the art to which it appertains to make and use the same.

My invention relates to milking apparatus and has for its object to provide an improved teat cup in which the milking action is very similar to that produced by the hand.

To the above ends the invention consists of the novel devices and combinations of devices hereinafter described and defined in the claims.

In milking apparatus, as is well known, milk is drawn from the cow by suction produced intermittently, or with a pulsating action. By my present invention, however, I greatly improve the milking action by providing the teat cup with a so-called "squeezing clock" that is engageable with one side of the teat, and is subject to suction on one side and to atmospheric pressure on the other.

This improved device, which may take various forms, is illustrated in its preferred form, in the accompanying drawings, wherein like characters indicate like parts throughout the several views.

Referring to the drawings, Figure 1 is a side elevation of the improved teat cup. Fig. 2 is a vertical longitudinal section taken centrally through the improved teat cup; and Fig. 3 is a transverse section taken on the line $x^3$ $x^3$ of Fig. 1.

The body of the teat cup is preferably in the form of a slightly tapered tube 1 having a contracted neck 2 at its discharge end to which one of the suction tubes 3 of the milking apparatus is attached. The said body 1—2 may be constructed of metal or other suitable material, but would preferably be constructed from vulcanized rubber. To the large or receiving end thereof is shown as applied a soft rubber cap 4 having a large central perforation $4^a$ through which the teat may be inserted.

At one side or, as shown, at the bottom, the tubular body 1 is provided with a large longitudinally extended opening 5 that affords a passage through which works a hollow squeezing block 6, also preferably constructed from vulcanized rubber. In cross section, this so-called squeezing block 6 is preferably convex or rounded at its inner portion, and approximately flat at its outer portion. In longitudinal section, the said block is preferably tapered in a direction from the receiving toward the delivery end of the tubular body 1. To the outer portion of said squeezing block is attached a flexible diaphragm 7 preferably of rubber, the margin of which diaphragm is securely attached to the tubular body 1 surrounding the opening 5 thereof. This flexible diaphragm permits the squeezing block 6 to move laterally inward and outward through the opening 5. Attached to said block 6 is a leaf spring 8, the outwardly projected portion of which is fulcrumed at 9 to a split clamping ring 10 applied to the tubular body 1 near its delivery end. A small adjusting screw 11 is passed through a perforation in the end of the spring 8 and is screwed into the delivery end portion of the tubular body 1. The spring 8 tends to throw the squeezing block 6 outward or into a retracted position and, by adjustments of the screw 11, the force under which said spring will act may be varied, so as to set the same for proper action in harmony with suction pulsations of different intensity produced in the milking apparatus by suitable pulsating device, such, for instance, as that disclosed and claimed in my companion application filed of even date herewith entitled "Pulsating Device for Milking Apparatus."

In applying the device, the teat is, of course, passed through the large perforation $4^a$ of the diaphragm 4 and the milk is, of course, drawn in a direction toward the neck 2. When a pulsation under pressure within the apparatus is produced, that is, when the suction or vacuum within is increased, the so-called squeezing block 6 will be drawn inward and will press the teat with a pressure that is greatest at the receiving end of the cup, and decreases toward the delivery or lower end thereof, this being an action, as is obvious, which greatly facilitates in drawing the milk. The inward movement of the block 6 is, of course, due to the excess of the atmospheric pressure over that within the cup, and it is of course evident that external pressure on practically the entire outer surface of the diaphragm 7 will be effective in forcing the said squeezing block inward. The block will, therefore, be drawn inward under considerable force, even under slight reduction in the internal pressure, or otherwise stated, under slight suction within the teat cup. The pressure under which the squeezing block will act may, as already indicated, be varied by adjustments of the screw 11, so as to thereby vary the outward force of the spring 8.

I believe it to be broadly new to provide a teat cup with a laterally movable squeezing block or device, and, hence, desire to claim the same broadly.

What I claim is:

1. A teat cup having a laterally movable squeezing block and a pliable diaphragm yieldingly connecting said block to said cup, and which block and diaphragm are subject to atmospheric pressure, substantially as described.

2. The combination with a teat cup having an opening at one side, of a squeezing block working through said opening and connected at one end to said cup, a pliable diaphragm yieldingly connecting said block to said cup, and a spring yieldingly pressing said block outward, and which block and diaphragm are subject to atmospheric pressure, substantially as described.

3. The combination with a teat cup having an opening in one side, of a squeezing block working through said opening and yieldingly attached to said cup at one end, a pliable diaphragm connecting said block to said cup, a spring yieldingly pressing said block outward, and means for adjusting the tension of said spring, substantially as described.

In testimony whereof I affix my signature in presence of two witnesses.

EZRA E. GOOD.

Witnesses:
MALIE HOEL,
F. D. MERCHANT.